Figure 1:
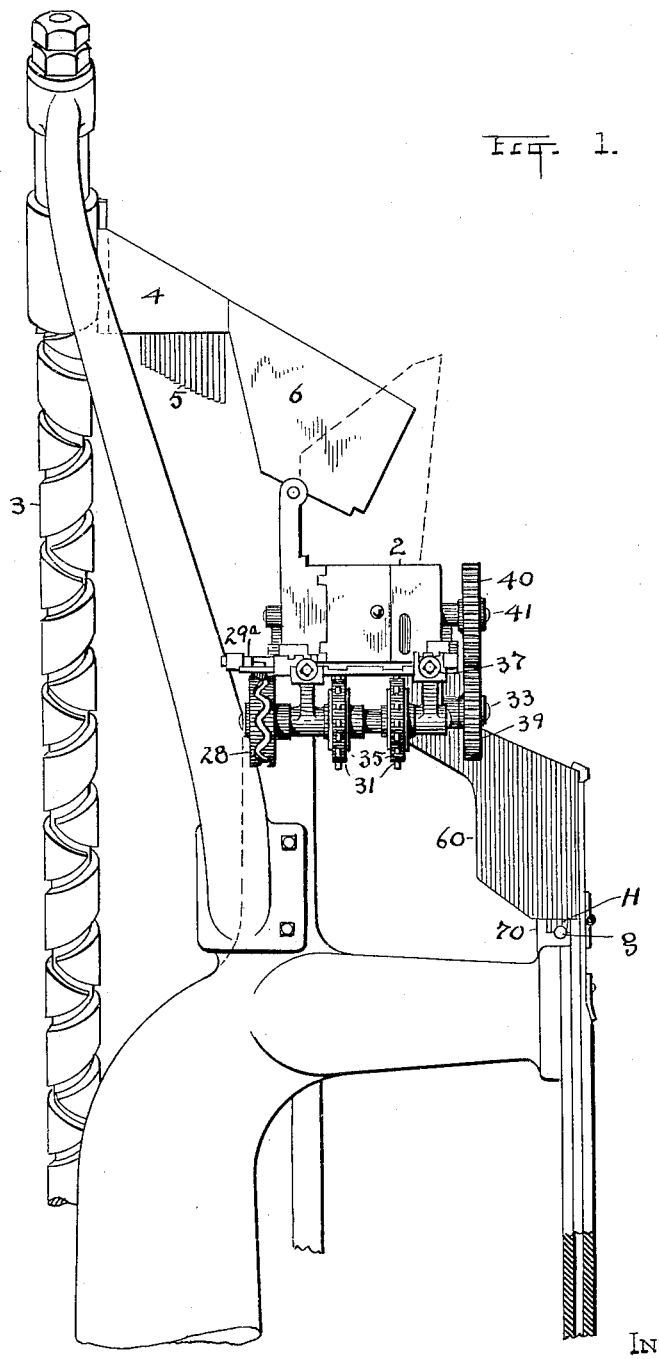

No. 657,040. Patented Aug. 28, 1900.
R. H. ST. JOHN.
TYPE BAR MACHINE.
(Application filed Oct. 11, 1898.)
(No Model.) 7 Sheets—Sheet 1.

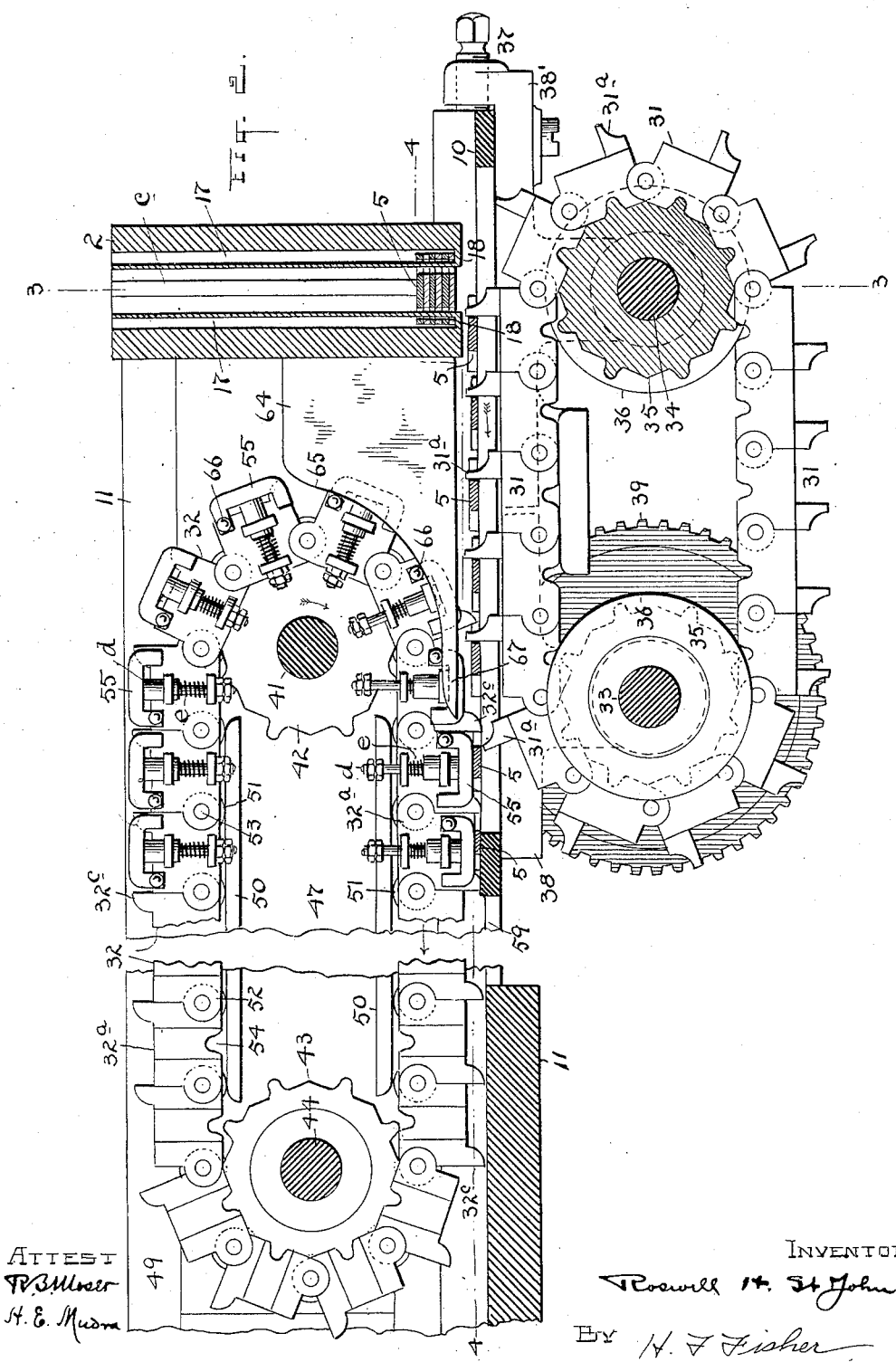

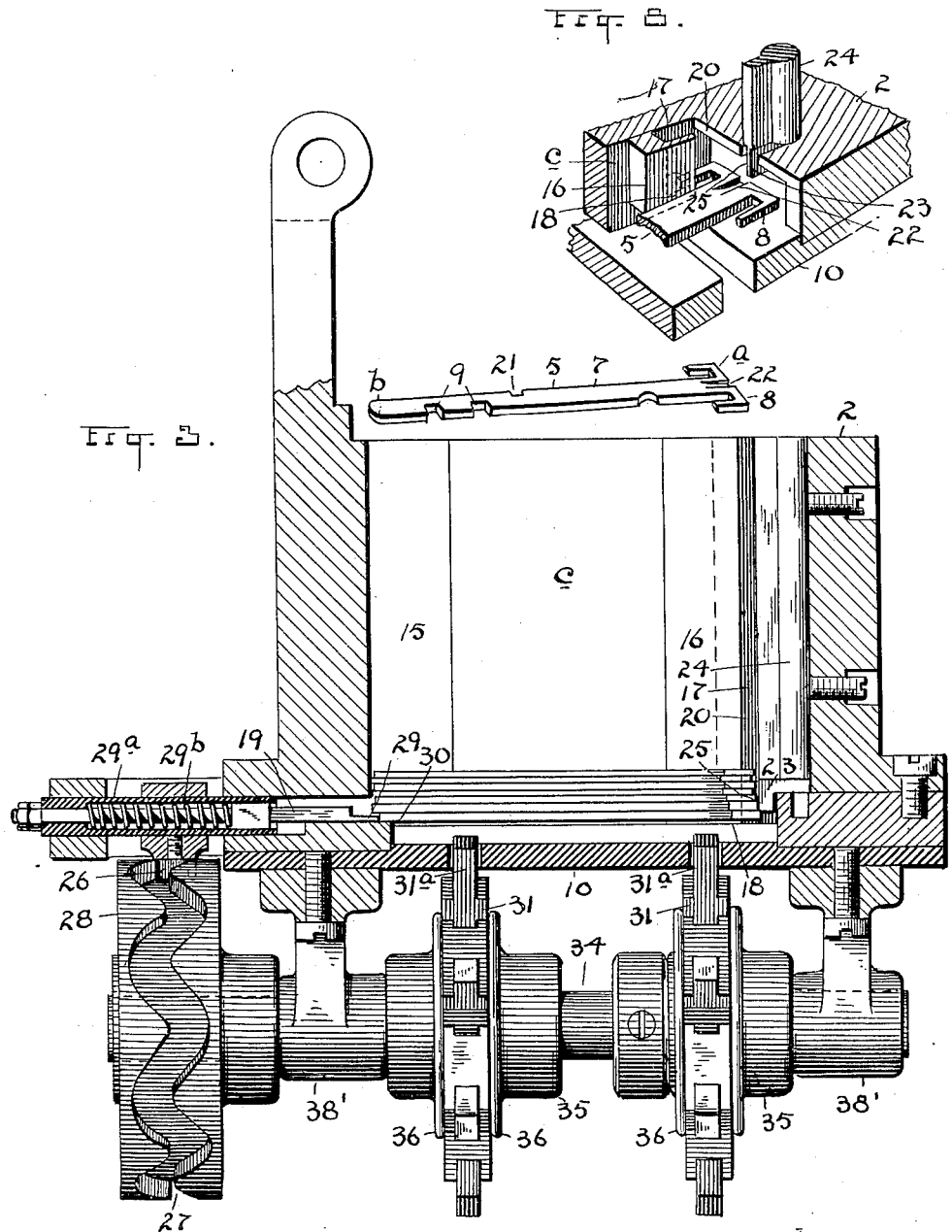

No. 657,040. Patented Aug. 28, 1900.
R. H. ST. JOHN.
TYPE BAR MACHINE.
(Application filed Oct. 11, 1898.)
(No Model.) 7 Sheets—Sheet 4.
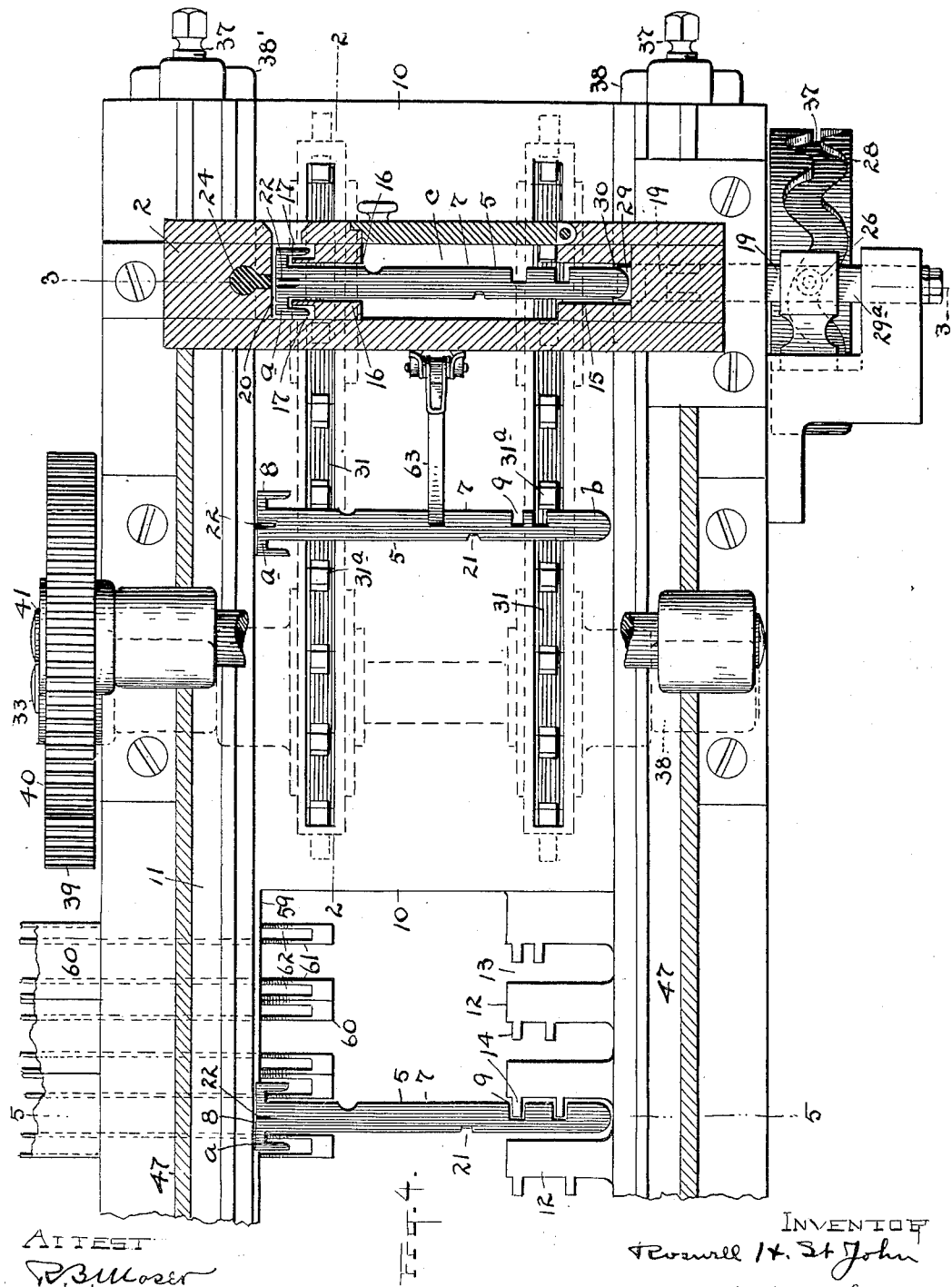

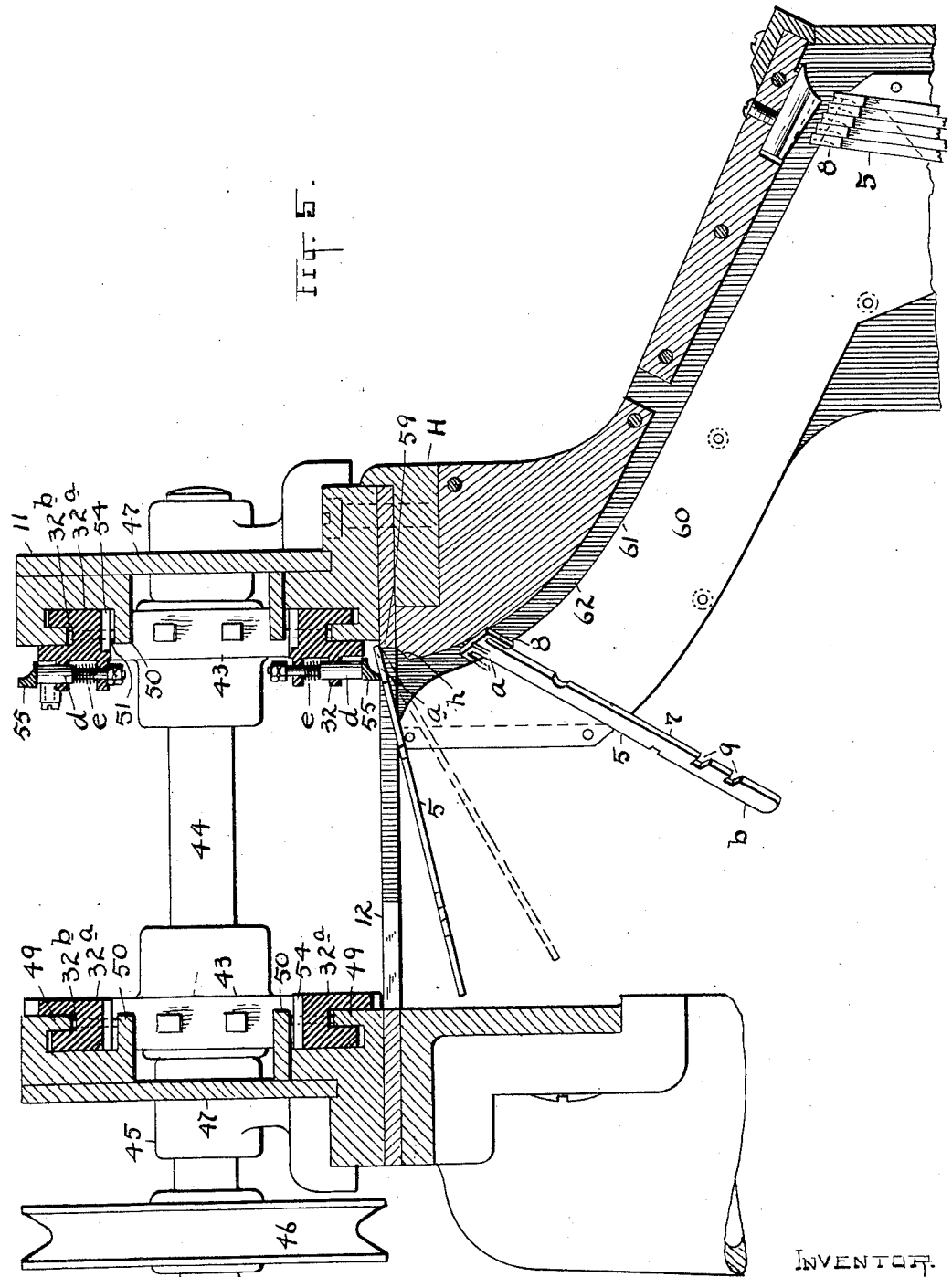

No. 657,040. Patented Aug. 28, 1900.
R. H. ST. JOHN.
TYPE BAR MACHINE.
(Application filed Oct. 11, 1898.)
(No Model.) 7 Sheets—Sheet 6.
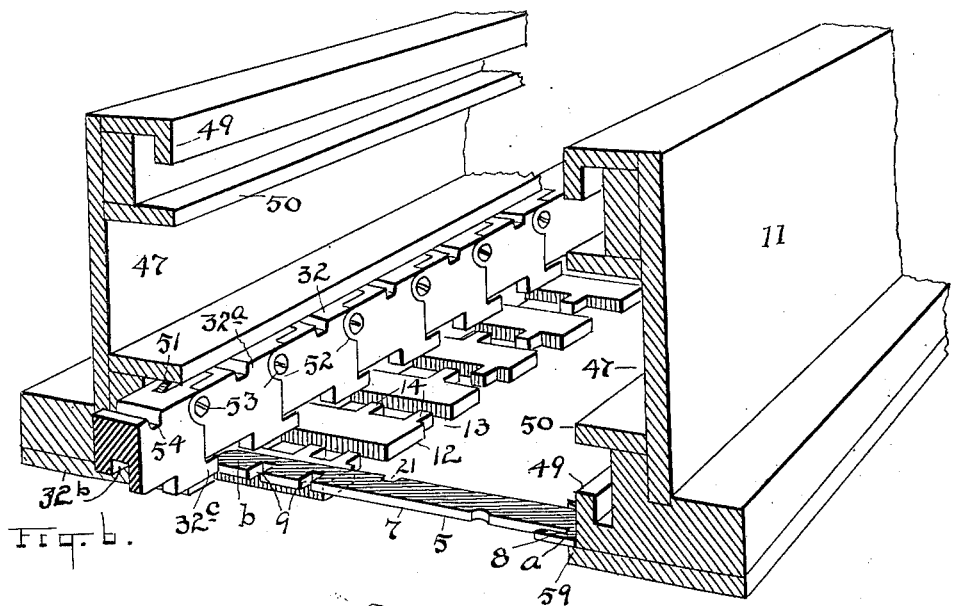
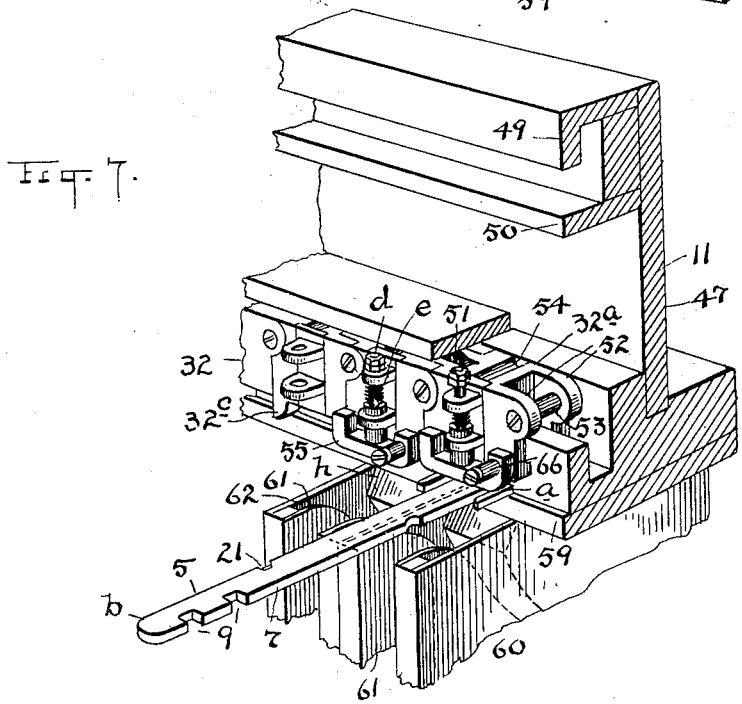

No. 657,040. Patented Aug. 28, 1900.
R. H. ST. JOHN.
TYPE BAR MACHINE.
(Application filed Oct. 1, 1898.)
(No Model.) 7 Sheets—Sheet 7.
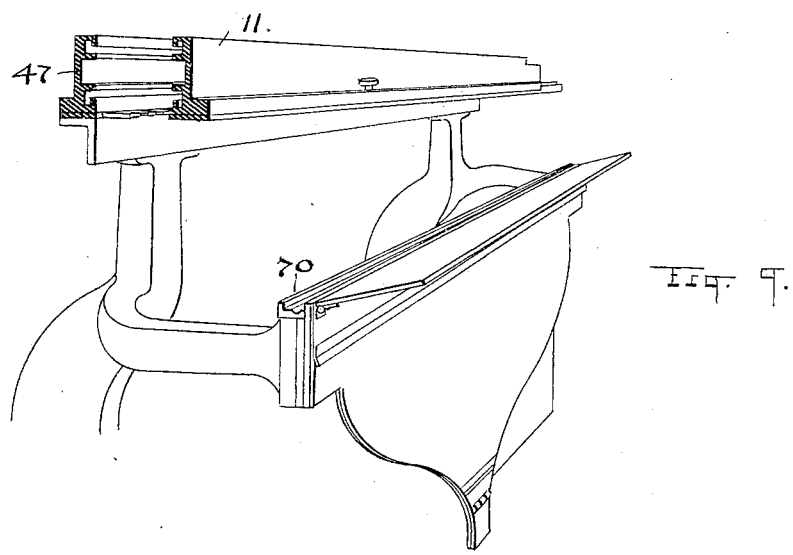
Fig. 9.
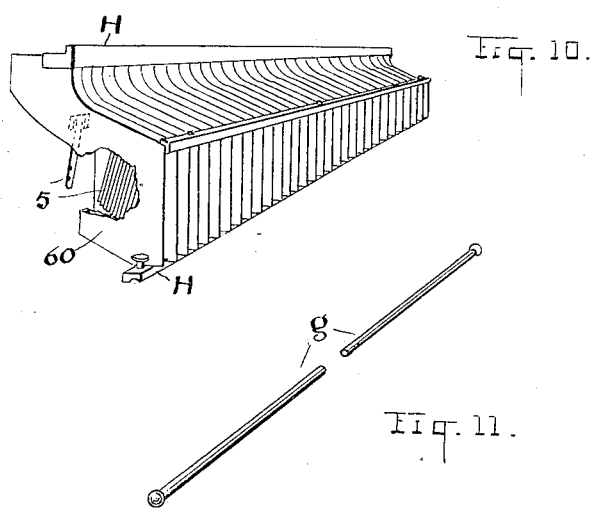
Fig. 10.
Fig. 11.
ATTEST
INVENTOR
Roswell H. St John
BY W. F. Fisher
ATTY

UNITED STATES PATENT OFFICE.

ROSWELL H. ST. JOHN, OF CLEVELAND, OHIO, ASSIGNOR TO JOSEPH J. LITTLE, EDWARD D. APPLETON, AND HOMER EATON, TRUSTEES, OF NEW YORK, N. Y.

TYPE-BAR MACHINE.

SPECIFICATION forming part of Letters Patent No. 657,040, dated August 28, 1900.

Application filed October 11, 1898. Serial No. 693,230. (No model.)

*To all whom it may concern:*

Be it known that I, ROSWELL H. ST. JOHN, a citizen of the United States, residing at Cleveland, in the county of Cuyahoga and State of Ohio, have invented certain new and useful Improvements in Type-Bar Machines; and I do declare that the following is a full, clear, and exact description of the invention, which will enable others skilled in the art to which it appertains to make and use the same.

My invention relates to improvements in type-bar machines; and the invention consists more particularly in distributing mechanism for the matrices, but embodies a few other features as well, all substantially as shown and described, and particularly pointed out in the claims.

In the accompanying drawings, Figure 1 is an end elevation of the distributing mechanism mounted on the frame of a type-bar machine in which matrices are used to produce the type-bars; but only such parts as deliver the matrices in bulk to the distributer and from there singly to the magazines are shown in this view and more is not required for the purposes of this description. Fig. 2 is a longitudinal sectional elevation on line 2 2 of Fig. 4, enlarged in respect to Fig. 1, and showing more especially the receiving-box, feeder-chain, and distributing or carrier chain, the distributing-chain being broken away at its center to bring the ends within the limits of the drawings and showing the chain at the left with some of its parts removed to more clearly disclose the lugs for carrying the matrices forward. Fig. 3 is a cross-section of the receiving-box on line 3 3 of Figs. 2 and 4, showing especially the grooved cam and plunger device for feeding single matrices successively to the feeder-chain. Fig. 4 is a plan section looking down from a line corresponding to 4 4 of Fig. 2. Fig. 5 is a cross-section of the distributing-box and a longitudinal sectional elevation of a single magazine-channel or matrix-receptacle, the view being taken on a line corresponding to line 5 5 of Fig. 4 looking to the left. A matrix is shown in edge elevation as being discharged by the spring-bolt on the distributing or carrier chain, and another matrix just this side is shown in perspective dropping into its channel or magazine. In fact, however, the said matrix sustains the same edgewise relation in all its positions as it travels into the magazine. Fig. 6 is a cross-section and perspective elevation more particularly of one side of the distributing-box and showing also a section of the left distributing or carrier chain and a single matrix in position to be carried forward to its drop. Fig. 7 is a sectional and perspective detail of the right or opposite side to that shown in Fig. 6 of the distributing-box and carrier-chain, with a single matrix in position to be discharged into its receptacle or magazine, presumably the same as shown in Fig. 6. Fig. 8 is a detail perspective view of the gage in the matrix-receiving box preparatory to distributing the matrices, but which allows but one matrix at a time to be discharged from said box. Fig. 9 is a perspective view of the distributing-box and the magazine-channel supports, the receiving-box being removed and showing the distributing-box in section. Fig. 10 is a perspective view of a complete magazine-frame, and Fig. 11 is a perspective view of the bolts for locking the said frame into place.

The distributing mechanism thus shown and hereinafter more fully described is designed more especially for distributing matrices in type-bar or linotype machines; but with very slight modifications in regard to proportions and the like the same construction can be used for distributing type.

In the type-bar machine in which the present invention is used the practice is to assemble a number of matrices of like character in magazine-channels 60, from which they are released one at a time, as may be required, for composing a line of type. After the matrices have been used to produce a type-bar they are all promptly returned by automatic arrangements to their respective magazine-channels; but before this can be done each matrix must be separated or assorted from the others and then individually distributed into its own channel.

In Fig. 1 a double-threaded screw 3 is shown, carrying a traveling box 4, which deposits its load of matrices 5, presumably a complete line, into a transferring device 6, which in turn deposits the entire load into the distributing-box 2. A detail description of the matrix-bulk-carrying devices is not entered into in this case, as the exact construction of the same is not deemed material to the distributing device, which more particularly constitutes the invention in hand. In fact the matrices can be deposited into the distributing-box 2 by any suitable means or even by hand, if desired.

The matrices 5 are all of uniform size and shape except in thickness, which depends on the size of the character thereon and such modifications of detail as may be required to cause each matrix to definitely find its own channel. All alike have a long body portion or shank 7 and a T-shaped head at one end and a rounded extremity at the other end. Between these ends, and particularly toward the smaller end $b$, the matrices are formed with notches or recesses 9 in their edges, which are alike as to all characters of the same kind, but unlike as to all the others, so that only like characters will come together. How this works out is plainly seen in Fig. 6, where each successive dropping-space is unlike all the others, and hence each matrix can only drop where it belongs. This appears clear as we further examine the distributing-box, which is provided with alternate inward projections 12 and openings 13, and each projection 12 has one or more lugs 14 extending into and partly across the said opening at one or both sides. These lugs are so arranged and distributed in each and every opening 13 as to be distinctly different from all the others, and so that all the other matrices than those intended for it will slide over and along just as if they were passing over a continuously-smooth surface. In practice about ninety different characters are used, and so ninety openings 13 are needed to accommodate them, and no two are alike as to their notches 9, as no two arrangements of the corresponding lugs 14 are alike in position or space.

Returning now to the distributing-box 2, (shown in plan, Fig. 4, and in section, Fig. 3,) the said box, it will be seen, is provided with an opening $c$, extending from top to bottom of about the width of the matrix, and the matrices 5 lie flat one upon the other between the walls 15 and 16 at its sides. The T-head of the matrix rests its extremities within the vertical channel 17 at each side of the walls 16, and this channel is open at the top, but closed at the bottom, where a slight ledge 18 is formed to hold the matrices up until they are pushed off by the plunger 19. (Shown at the left in Fig. 3.) This plunger acts axially on the matrix and pushes it far enough endwise to disengage it at both ends and cause it to drop. The channel 20, in which the T of the matrix rests, is enlarged at the bottom at a point opposite ledges 18, and this allows the side movement necessary for the matrix-arms to clear the ledge 18 and drop down upon the base-plate 10. Now as the matrices vary in thickness according to the character or letter upon the edge at 21 provision is made to accommodate the varying thicknesses thereof, so as to allow only one matrix at a time to be pushed and dropped out of the box by plunger 19. To this end all the thicker or heavier matrices have a groove or channel 22 in their face at the T end, and this groove is cut down a certain depth in all that are cut, so as to leave a certain thickness of metal corresponding to the depth of the thinnest matrix. Opposite this groove 22 is a thin inwardly-projecting fin 23, which is part of the vertical rod or bar 24, adjustably held within the end of the box by set-screws or other suitable means. The thinnest matrices resting upon ledges 18 are free to slide under the fin 23, and thus drop down free when the arms of the head 8 ride beyond the edge of ledges 18; but the matrices above abut against the front edge 25 of the pin and are prevented from feeding out by frictional contact with the discharging matrix. As this adjustment of fin is necessarily very fine and fixed when made, it will be seen that the thicker matrices would not pass under the fin when it is down in working position, and so the grooves 22 are cut deep enough and long enough to allow any-sized matrix to be discharged, the fin fitting freely in the groove, but still serving its purpose of holding back the upper matrices, whether thin or thick, and operating on all alike.

The plunger 19 is carried back and forth with evenly-timed movements by means of a roller 26, fixed on its bottom and traveling in the sinuous channel 27 in the periphery of the cam roller or wheel 28. As the matrices feed down by gravity, they first rest at their small end on the end 29 of the plunger and then drop down upon the ledge 30 as the plunger is withdrawn. At the other end they rest on the ledge 18. When the plunger comes forward again, the end 29 thereof pushes the lower matrix off both ledges 30 and 18, and the said matrix then falls upon the base-plate 10, where the feeder-chains 31 engage and move it forward to be engaged by the carrier-chains 32, as most clearly seen in Fig. 2.

The plate 10 is a short plate between the box 2 and the distributing carrier-chains and is formed on each side with a slot, through which the engaging spurs $31^a$ of the feeder-chains 31 project and travel. Said slots commence just outside box 2 and continue to near the end of plate 10, as seen in Fig. 4. The carrying-ledge 59 for the heads of the matrices and the projections 12 at the opposite side begin at said plate. The chains 31 are arranged one at each side and are mounted upon flat-faced gears 35, having flanges 36 to keep the chains in alinement. Said gears are supported upon shafts 33 and 34, Fig. 2, journaled in bearings 38 and 38', which are hung from the bottom of the base-plate. Set-screws 37 furnish means for tightening or loosening the chains 31 by moving the bearings 38' back or forth, and a gear 39 upon one end of shaft 33, Fig. 4, transmits the power from a gear 40 upon shaft 41, which carries the spur-wheels 42 for the carrier-chains 32.

The carrier-chains 32 in a full-sized machine have a straight travel of six feet, more or less, and the distance is sufficient in any case to cover the space required for, say, ninety different matrices and corresponding magazine-channels. At the other side or end, opposite the distributing-box 2 and wheels 42, the chains pass around the flat-faced spur-rollers 43, which are mounted on the cross-shaft 44, Fig. 2. The shaft 44 is supported in bearings 45 on the distributing-trough 11, and a pulley 46 furnishes the means through which the power is applied to operate all of said parts. Gearing can be substituted for the pulley, if desired. The long line of travel of the matrix-carrying chains makes it imperative that some means for guiding and keeping the chains in alinement be used, and to this end the sides 47 of the distributing-box 11 are constructed with channels having confining-ledges 49 and 50 at right angles to each other, and each link $32^a$ is made with a channel or groove $32^b$, engaging over ledge 49. Rollers 51, Fig. 7, journaled within each link, ride between ledges 49 and 50 and take the wear, as well as form an antifriction-bearing for said links. The links are pivotally connected together through overlapping ears 52 by pins 53. Each link has a central transverse groove 54 in its top or outer surface, into which the teeth or spurs on the rollers 42 and 43 engage as the chains pass around the same. Each link $32^a$ of the carrier-chains 32 also has a projecting lug $32^c$ at what becomes its forward or engaging edge when in action and reaching down to near the base-plate when the chains are in engagement with the matrices, and these lugs gather up and carry along the matrices as they are fed to the carrier-chains by the feeder-chains from distributing-box 2. The feeder-chains 31 and carrier-chains 32 are timed to move at the same rate of speed, and the matrices are delivered singly and in rapid succession one after the other until the supply from box 2 is exhausted. Now in order that there may be no delay in discharging the matrices from the carrier as each one comes to its drop the links of chain 32, operating at the heads of the matrices, are each provided with a spring-pressed T-shaped presser 55, having its stem $d$ supported in ears on the front of the link and with an interposed spring $e$ to bear the presser down to acting position. The engaging edge of the presser is straight lengthwise, so as to bear flat on the matrix, and is cut away or reduced back of its point of immediate engagement, so as to carry the point of engagement as far as possible from the fulcrum of the matrix on ledge 59. Then as the matrix reaches its opening 13 and drops at that end the presser will exert itself at once to effect one instant swing of the matrix into the mouth of its channel. Obviously if the spring be at all strong the drop or turn from first position (seen in Fig. 5) to the next and down into the bank-channel will occur instantly and before the presser can have time to travel off the head $a$. The narrow ledge 59 runs the entire length of the carrier-chains, and the heads of the matrices rest upon it, while the other ends are supported by the projections 12 and lugs 14, as already described.

The magazine-channels 60 are arranged side by side in close proximity and are alike, so that the description of one will answer for all. Each channel extends inward a short distance from ledge 59 and is open at its top and edge to receive the matrix when thrown down by the presser-foot 55. Inner walls 61, having their upper edges curved and inclined inward, serve as guides and supports for the matrices, the T-shaped heads of which drop into the open passage-ways 62 and slide down into the channel 60. In Fig. 5 one of these guide-walls 61 is removed while the matrix shown is engaged over the remaining wall. As soon as a matrix is released at its small end it swings in between the walls 61, and the hooks on the T-head cannot fail to engage as they are designed to. To insure the transverse alinement of the matrices as they approach the carrier, a spring-pressed bar 63 is pivoted to the wall of the distributing-box 2, and this bar is centrally located between the two feeder-chains 31 and serves to retard the forward movement of the matrix sufficiently to even its ends. This is not necessary in all cases, but is a good precaution.

The plunger 19, before described, is supported within a sliding bar $29^a$ and the roller 26 is mounted on this bar. A spring $29^b$, bearing against a shoulder within the bar and against a shoulder on the plunger, serves to prevent the plunger from jamming a matrix if it be bent or slightly defective and should stick in the distributing-box. Then again the action of the spring on the plunger serves to discharge the matrices evenly and quickly without hammering or mutilating them.

When the machine is in active use, the feeder and carrier chains 31 and 32, respectively, with their associate mechanism, are constantly in motion, whether matrices are or are not within the feed-box 2. As soon as a load of matrices is dumped into the said box the plunger 19, being in action, at once begins the work of discharge therefrom one at a time, which drop first upon the plate 10 and between two spurs of the feeder-chains 31. The travel of all the released matrices is forward toward the carrier-chains 32, and they are alined transversely as they go; but in order that the matrices shall be disturbed in their right position and relation as they are taken up by the carrier-chains 32 and to avoid possible tilting at the point where they leave the endless chains 31 for the endless chains 32, I have arranged a plate 64 with a curved edge 65 to engage the presser-feet 55 and keep them off the heads of the matrices until they are completely engaged at both ends by the chains 32. Then each presser-foot 55 rides easily off the curved edge 65 and onto its matrix and remains there till the matrix reaches its drop. A short extending pin 66 on each bolt engages this edge eccentric 65 before the roller 42 makes a third of a revolution and then continuing each bolt is pressed back by the pin riding on the eccentric until the extremity 67 is reached, where the pin then goes free and allows the bolt to engage the matrix, as described. As the matrices travel forward at a comparatively-slow speed, they are all distributed before they reach the outer extremity of the trough, so that none are carried over. They may go to different channels, or several may successively drop into the same channel, and the carrier will as readily drop all into one channel as into several if they all be of the same kind. This is mentioned to show the rapidity with which the matrices are discharged from the carrier. Hence, also, the distributer can easily take care of the matrices as they come along however rapidly the machine may be operated, and eight to ten lines can easily be distributed in a minute and not tax the distributer for speed or accuracy.

All the magazine-channels are built into a single supporting-frame, so that the frame and all are removable at once from the machine. The complete frame and its magazine-channels are shown together and alone in Fig. 10 and in position on the frame at their top in Fig. 5, while their whole support is plain in Fig. 9. The lower support 70 has a semicircular groove lengthwise, and the lower bar of the frame H has a corresponding groove. Hence when the said frame H is seated above and below, as in Fig. 1, for use the half-length bolts $g$ are inserted in the channel aforesaid between frame H and rest 70, and as such they serve to aline the frame and secure it in working position. As each magazine-frame carries its own matrices, there can be an entire change of font of type in the brief time required to make this exchange. This can be done also while the machine is in operation. The frame itself, H, which carries the magazine-channels, is a mere skeleton, and the channels are each and all rigidly but removably attached thereto. Hence when a frame H is removed the channels are all lifted off with it and so, also, when they are put back. The time required for changing the magazine-channels or founts is so comparatively brief that in newspaper or other work where it is desired to use a different font for a quotation or the like it can be done and not cause any appreciable delay.

Referring to Fig. 5, it will be noticed that after the matrix-bar drops from the ledge at its head end it drops onto the inclined shoulder $h$, which produces just enough detention or delay in the dropping at this end to insure an unerring lodgment of the matrices in their channels and without any danger that they will get away.

What I claim is—

1. In a type-bar machine having a flat straight horizontal distributing-surface, distributing mechanism constructed to carry the matrices singly and flatwise over said distributing-surface parallel to each other and to drop each matrix in its own place, substantially as set forth.

2. In distributing mechanism for matrices, a distributing-trough with parallel sides having a series of inward projections along one edge and intervening spaces alternately, and said projections having diversified lugs on their edges, substantially as described.

3. The matrix-distributing trough having a straight unbroken ledge along one edge and separate inward projections along the other ledge having variously-distributed lugs out of register with each other, substantially as described.

4. A matrix-distributing trough having parallel sides, a ledge along one side to carry the heads of the matrices and spaced inward projections along the other side to carry the opposite ends of the matrices, provided with suitable selecting means and means to slide the matrices flatwise successively along over said ledge and projections, substantially as described.

5. The matrix-distributing trough having a continuous ledge along one side and a series of inwardly-projecting parts along the other side having variously-scattered lugs at their edges, and carrying mechanism for the matrices constructed to take one matrix at a time and move it along over said ledge and projections to its destination, substantially as described.

6. The distributing mechanism consisting of the trough with parallel sides having a series of flat strips extending inward from one side and provided with lugs at their edges in different positions one from the other, relatively, so that no two strips are alike, and a continuous ledge to support the heads of the matrices, in combination with means to engage both ends of the matrices and distribute them, substantially as described.

7. The means for carrying the matrices consisting of a trough with parallel sides and parallel spacing-strips transversely of said sides at regular intervals arranged to allow the matrices to drop flatwise between them, one of said sides having a continuous support to carry the heads of the matrices, in combination with flexible endless carriers to engage the matrices and slide them along, substantially as described.

8. The matrix-distributing trough constructed at its bottom to drop the matrices into their magazine-channels, in combination with means to move the matrices singly on their sides over said bottom to their several channels, and means to bear on one end of each matrix as it reaches its place and cast it to its chamber, substantially as described.

9. A distributing-trough for matrices having its bottom constructed to permit passage of the matrices, a carrier to move the matrices singly on their sides along to their destination, and a spring-pressed device adapted to bear on one end of each matrix and assist in its discharge, substantially as described.

10. In a matrix-distributing mechanism, a suitable trough having openings in its bottom for the matrices to drop through, in combination with an endless carrier to convey the matrices and a spring-pressed device on said carrier constructed to bear on the heads of the matrices, substantially as described.

11. The distributing mechanism for the matrices comprising a distributing-trough having its bottom constructed to drop the matrices to their proper channels, in combination with matrices arranged transversely of said trough across its bottom, and an endless carrier to engage each end of each matrix and slide it along to its destination, substantially as described.

12. In matrix-distributing mechanism, a chain for engaging the heads of the matrices singly having projections to bear against the edges of the matrices and carry them along, a spring-pressed foot to lie flat upon each matrix and tilt it to its channel, and means to liberate the small end of each matrix, substantially as described.

13. The support for the matrices provided with a ledge at one side and a series of lugged projections at the other side and openings between said projections through which the small end of the matrix is adapted to drop, in combination with endless carriers for the matrices one of which has a spring-pressed part to bear on the head of the matrix, and channels for the matrices arranged along beneath said spring-pressed parts into which the matrices are thrown, substantially as described.

14. In a distributing mechanism for matrices constructed at its bottom to move the matrices horizontally to their destination, a set of traveling carriers arranged to engage the ends of the matrices and one of said carriers having spring-pressed members to bear upon one side of the heads of the matrices to tilt them into their channels, in combination with a series of channels having engaging edges onto which the heads of the matrices are swung when released, substantially as described.

15. The endless carrier for the heads of matrices, and a series of spring-pressed members successively on its side to bear on the matrix-heads, said members having a straight engaging portion along their edges farthest from the carrier, in combination with a continuous ledge over which said heads slide and means to release the small ends of the matrices, substantially as described.

16. The carriers for the matrices substantially as described consisting each of a series of links having projections to bear against the edges of the matrices at both their ends and supports for the matrices having a smooth upper surface over which the matrices are adapted to slide flatwise to their destination, said supports provided with a series of openings to drop the matrices through, substantially as described.

17. A matrix-distributing mechanism comprising a distributing-box to receive the matrices in bulk, mechanism to release the matrices separately therefrom, and carrier-chains to distribute the matrices singly and successively to separate channels, in combination with said channels having exposed edges to engage the heads of the matrices as they are dropped, and said carriers bearing against both ends of the matrices, substantially as described.

18. The matrix-distributing box and mechanism to discharge the matrices singly flatwise from said box, carrier-chains to convey the matrices to their respective magazine-channels and means to transfer the matrices from the said box to said chains, in combination with a trough over which the matrices are carried to their channels provided with openings in its bottom, and means to momentarily detain the heads of the matrices after the small ends have been dropped, substantially as described.

19. In a matrix-distributer, a distributing-box constructed to hold matrices in bulk flatwise on each other, traveling distributing-chains to engage both ends of the matrices, and means to release single matrices at different points from said chains, substantially as described.

20. In a matrix-distributer, a distributing-box constructed to hold matrices in bulk and separate channels to receive said matrices, in combination with distributing-chains beneath said box, means to feed the matrices singly from said box to said chains, and carrier-chains above said distributing-chains to slide the matrices horizontally to their respective channels, substantially as described.

21. A matrix-distributing mechanism consisting of a distributing-box to supply the matrices singly and successively, upper and lower distributing-chains arranged to overlap each other, channels to receive the matrices and supports for the matrices beneath the feed-chains constructed to govern their discharge to said channels, substantially as described.

22. A matrix having a substantially T-shaped head, a distributing-box constructed to support the matrix horizontally, means to thrust the lower matrix in the box endwise to release it from said box, and endless chains to engage the ends of the matrix to carry it to its destination, substantially as described.

23. The distributing-box to hold the matrices in bulk having one end constructed to receive T-headed matrices, and means at the other end of the box to slide one matrix at a time lengthwise and release it at both ends from the bottom of said box, substantially as described.

24. The double set of matrix-carrier chains, one overlapping the other, a series of spring-pressed members on the upper of said chains, and a track constructed to raise each of said spring-pressed members as it comes around to hold it from engagement with a matrix temporarily, substantially as described.

25. The distributing-box and the endless chains beneath the same, and the distributing-trough having a track part way along one side thereof, in combination with two matrix-carrying chains one over the other, and spring-pressed members on one of said chains constructed to be temporarily held by said track out of contact with the matrices, substantially as described.

26. In a type-bar machine using T-headed matrices, a series of matrix magazine-channels having each two guideways to engage the heads of the matrices and conduct them to their rest, and means to bear upon the heads of the matrices and tilt them onto said guideways, substantially as described.

27. The distributing-trough for the matrices having an unbroken ledge along one edge and openings along the other edge to drop the small ends of the matrices, in combination with channels for the matrices having their mouths extending outward beyond said ledge and spring-pressed means over said ledge to tilt the matrices and throw them into their channels, substantially as described.

Witness my hand to the foregoing specification this 12th day of August, 1898.

ROSWELL H. ST. JOHN.

Witnesses:
H. T. FISHER,
R. B. MOSER.